US010173690B2

(12) United States Patent
Mukai

(10) Patent No.: US 10,173,690 B2
(45) Date of Patent: Jan. 8, 2019

(54) VEHICLE, VEHICLE CONTROLLER, VEHICLE CONTROL METHOD, AND MEDIUM STORING VEHICLE CONTROL PROGRAM

(71) Applicant: HONDA MOTOR CO., LTD., Tokyo (JP)

(72) Inventor: Takuyuki Mukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 15/419,156

(22) Filed: Jan. 30, 2017

(65) Prior Publication Data
US 2017/0225689 A1 Aug. 10, 2017

(30) Foreign Application Priority Data

Feb. 10, 2016 (JP) .................................. 2016-024017

(51) Int. Cl.
*B60W 50/00* (2006.01)
*B60W 20/11* (2016.01)
(Continued)

(52) U.S. Cl.
CPC ........ *B60W 50/0097* (2013.01); *B60W 10/06* (2013.01); *B60W 10/08* (2013.01);
(Continued)

(58) Field of Classification Search
CPC .. B60W 50/0097; B60W 20/11; B60W 20/40; B60W 10/06; B60W 10/08; B60W 10/18; B60W 30/16; B60W 30/18
(Continued)

(56) References Cited

U.S. PATENT DOCUMENTS 8,949,016 B1 * 2/2015 Ferguson ............... B60W 30/00
340/436
9,008,890 B1 * 4/2015 Herbach ............... B60W 30/00
340/435
(Continued)

FOREIGN PATENT DOCUMENTS

| JP | 7-108853 A | 4/1995 |
|----|-----------|--------|
| JP | 2002-251690 A | 9/2002 |
| JP | 2011-240816 A | 12/2011 |

OTHER PUBLICATIONS

Office Action dated Feb. 6, 2018, issued in counterpart Japanese Application No. 2016-024017, with English machine translation. (9 pages).

*Primary Examiner* — Thomas G Black
*Assistant Examiner* — Luat T Huynh
(74) *Attorney, Agent, or Firm* — Westerman, Hattori, Daniels & Adrian, LLP

(57) ABSTRACT

A vehicle includes a detection section and a automated drive controller. The detection section detects actual behavior of the vehicle. The automated drive controller generates a automated drive action plan for the vehicle, issues an instruction relating to behavior of the vehicle based on the generated action plan to a drive source controller that controls a drive source of the vehicle, and compares predicted behavior of the vehicle predicted based on the issued instruction and actual behavior of the vehicle detected by the detection section. In cases where the predicted behavior of the vehicle and the actual behavior of the vehicle detected by the detection section differ from each other by more than a preset range, the automated drive controller issues an instruction to decelerate the vehicle to a brake device of the vehicle.

17 Claims, 9 Drawing Sheets

(51) Int. Cl.
    *B60W 10/06*  (2006.01)
    *B60W 10/08*  (2006.01)
    *B60W 10/18*  (2012.01)
    *B60W 20/40*  (2016.01)
    *B60W 30/16*  (2012.01)
    *B60W 30/18*  (2012.01)
    *B60W 50/02*  (2012.01)

(52) U.S. Cl.
    CPC ............ *B60W 10/18* (2013.01); *B60W 20/11* (2016.01); *B60W 20/40* (2013.01); *B60W 30/16* (2013.01); *B60W 30/18* (2013.01); *B60W 50/0205* (2013.01); *B60W 2510/06* (2013.01); *B60W 2510/08* (2013.01); *B60W 2510/18* (2013.01); *B60W 2520/105* (2013.01); *B60W 2710/06* (2013.01); *B60W 2710/08* (2013.01); *B60W 2750/30* (2013.01); *Y10S 903/93* (2013.01)

(58) Field of Classification Search
    USPC ........................................... 701/22, 23
    See application file for complete search history.

(56) References Cited

U.S. PATENT DOCUMENTS

| | | | | |
|---|---|---|---|---|
| 9,383,753 | B1* | 7/2016 | Templeton | G05D 1/0246 |
| 9,511,767 | B1* | 12/2016 | Okumura | G08G 1/0133 |
| 9,849,875 | B2* | 12/2017 | Hauler | B60W 30/09 |
| 9,972,054 | B1* | 5/2018 | Konrardy | G07C 5/08 |
| 2012/0323474 | A1* | 12/2012 | Breed | B60W 30/04 701/117 |
| 2014/0330479 | A1* | 11/2014 | Dolgov | B60W 30/16 701/28 |
| 2015/0266489 | A1* | 9/2015 | Solyom | B60W 50/029 701/23 |
| 2016/0129907 | A1* | 5/2016 | Kim | B60W 30/09 701/26 |

* cited by examiner

VEHICLE, VEHICLE CONTROLLER, VEHICLE CONTROL METHOD, AND MEDIUM STORING VEHICLE CONTROL PROGRAM

CROSS REFERENCES TO RELATED APPLICATIONS

The present application claims priority under 35 U.S.C. § 119 to Japanese Patent Application No. 2016-024017, filed Feb. 10, 2016, entitled "Vehicle, Vehicle Controller, Vehicle Control Method, And Vehicle Control Program." The contents of this application are incorporated herein by reference in their entirety.

TECHNICAL FIELD

The present disclosure relates to a vehicle, a vehicle controller, a vehicle control method, and a medium storing a vehicle control program.

BACKGROUND

An autonomous travel ECU is hitherto known that, together with setting a travel plan according to conditions around a vehicle, in cases where it has been determined to be necessary to perform an emergency stop of the vehicle based on abnormality information from another ECU, reconfigures the travel plan so as to stop the vehicle in accordance with control guidelines uniquely determined according to a preset emergency stopping mode and according to usable parts, these being specific parts of the vehicle other than an abnormal part of a control system (for example, see Japanese Unexamined Patent Application Publication No. 2011-240816).

SUMMARY

Research is ongoing into automated drive systems in which an ever smaller burden is placed on the driver in comparison to related driver assistance systems. There is a demand for further improvements to vehicle safety in such automated drive systems.

The present disclosure describes, for example, a vehicle, a vehicle controller, a vehicle control method, and a medium storing a vehicle control program capable of further increasing safety.

In a first aspect of the present disclosure, a vehicle includes: a drive source (81) that causes traveling drive force to be generate in the vehicle (M); a drive source controller (82) that controls the drive source; a brake device (90) that decelerates the vehicle; a first detection section (60) that detects actual behavior of the vehicle; and a automated drive controller (100) that generates a automated drive action plan for the vehicle, that issues an instruction relating to behavior of the vehicle based on the generated action plan to the drive source controller, that compares predicted behavior of the vehicle based on the issued instruction and actual behavior of the vehicle detected by the first detection section, and that, in cases where the predicted behavior of the vehicle based on the issued instruction and the actual behavior of the vehicle detected by the first detection section differ by more than a preset range, issues an instruction to decelerate the vehicle to the brake device.

A second aspect of the present disclosure is the first aspect of the present disclosure, wherein: the first detection section detects an actual acceleration of the vehicle; and the automated drive controller issues an instruction relating to a requested acceleration of the vehicle as the instruction relating to behavior of the vehicle, compares the requested acceleration of the vehicle and actual acceleration of the vehicle detected by the first detection section, and, in cases where the actual acceleration of the vehicle detected by the first detection section is larger than the requested acceleration by more than a preset range, issues an instruction to decelerate the vehicle to the brake device.

A third aspect of the present disclosure is the first aspect or the second aspect of the present disclosure, wherein: the drive source controller includes at least one first processor (82*a*) that controls the drive source; and the automated drive controller includes plural second processors (100*a*) in a greater number than the number of the first processors of the drive source controller, the plural second processors being capable of operating in parallel with each other such that each of the plurality of second processors is configured to have capability to issue the instruction to decelerate the vehicle to the brake device in the case where the predicted behavior of the vehicle and the actual behavior of the vehicle detected by the first detection section differ from each other by more than the preset range.

A fourth aspect of the present disclosure is any one of the first aspect to the third aspect of the present disclosure, further including: a second detection section (DT) that detects an object positioned nearby the vehicle; wherein, in cases where the predicted behavior of the vehicle based on the issued instruction and the actual behavior of the vehicle detected by the first detection section differ by more than a preset range, the automated drive controller derives a deceleration plan for the vehicle based on the object detected by the second detection section, and issues an instruction to decelerate the vehicle to the brake device based on the derived deceleration plan for the vehicle.

A fifth aspect of the present disclosure is the fourth aspect of the present disclosure, wherein: the second detection section detects, as the object, a nearby vehicle traveling nearby the vehicle; and the automated drive controller estimates future changes in the position of the nearby vehicle detected by the second detection section, and derives the deceleration plan for the vehicle based on the estimated future changes in the position of the nearby vehicle.

A sixth aspect of the present disclosure is the fifth aspect, wherein: the second detection section detects, as the nearby vehicle, a vehicle in front traveling directly in front of the vehicle and a vehicle behind traveling directly behind the vehicle; and the automated drive controller estimates future changes in the position of the vehicle in front and the vehicle behind detected by the second detection section, and derives the deceleration plan for the vehicle based on the estimated future changes in position of the vehicle in front and the vehicle behind.

A seventh aspect of the present disclosure is any one of the first aspect to the sixth aspect of the present disclosure, further including: a supply device (83) that supplies the drive source with an energy source of at least one of fuel or electric power, and that supplies electric power to the drive source controller. In cases where the predicted behavior of the vehicle based on the issued instruction and the actual behavior of the vehicle detected by the first detection section differ by more than a preset range, the automated drive controller issues, to the supply device, at least one out of an instruction to cut off the supply of the energy source to the drive source or an instruction to cut off the supply of electric power to the drive source controller.

An eighth aspect of the present disclosure is the seventh aspect of the present disclosure, wherein: after issuing the instruction to decelerate the vehicle to the brake device, the automated drive controller compares the predicted behavior of the vehicle based on the issued instruction to decelerate the vehicle and the actual behavior of the vehicle detected by the first detection section, and in cases where the predicted behavior of the vehicle based on the issued instruction to decelerate the vehicle and the actual behavior of the vehicle detected by the first detection section differ by more than a preset range, issues, to the supply device, at least one out of an instruction to cut off the supply of the energy source to the drive source or an instruction to cut off the supply of electric power to the drive source controller.

A ninth aspect of the present disclosure is any one of the first aspect to the eighth aspect of the present disclosure, further including an output device (94) that outputs an output recognizable by a driver of the vehicle. In cases where the predicted behavior of the vehicle based on the issued instruction and the actual behavior of the vehicle detected by the first detection section differ by more than a preset range, the automated drive controller issues, to the output device, an instruction to output content prompting switching from a automated drive mode to a manual driving mode.

A tenth aspect of the present disclosure is the ninth aspect, wherein: the automated drive controller includes a switching section (115) that detects an operation of switching from the automated drive mode to the manual driving mode, and, in cases where a switching operation from the automated drive mode to the manual driving mode has been detected by the switching section, the automated drive controller cancels the instruction to the brake device to decelerate the vehicle.

In an eleventh aspect of the present disclosure, a vehicle includes: a drive source that causes traveling drive force to be generated in the vehicle; a drive source controller that controls the drive source; a supply device that supplies the drive source with an energy source of at least one of fuel or electric power, and that supplies electric power to the drive source controller; a detection section that detects actual behavior of the vehicle; and a automated drive controller that generates a automated drive action plan for the vehicle, that issues the drive source controller an instruction relating to behavior of the vehicle based on the generated action plan, that compares predicted behavior of the vehicle based on the issued instruction and the actual behavior of the vehicle detected by the detection section, and that, in cases where the predicted behavior of the vehicle based on the issued instruction and the actual behavior of the vehicle detected by the detection section differ by more than a preset range, issues, to the supply device, at least one out of an instruction to cut off the supply of the energy source to the drive source or an instruction to cut off the supply of electric power to the drive source controller.

In a twelfth aspect of the present disclosure, a vehicle controller includes: a generation section (106) that generates a automated drive action plan for a vehicle; a first notification section (111) that issues an instruction relating to behavior of the vehicle based on the action plan generated by the generation section to a drive source controller that controls a drive source of the vehicle; a comparison section (121) that compares predicted behavior of the vehicle based on the instruction issued by the first notification section and actual behavior of the vehicle detected by a detection section; and a second notification section (112) that issues an instruction to decelerate the vehicle to a brake device of the vehicle in cases where the predicted behavior of the vehicle and the actual behavior of the vehicle compared by the comparison section differ by more than a preset range.

In a thirteenth aspect of the present disclosure, a vehicle controller includes: a generation section that generates a automated drive action plan for a vehicle; a first notification section that issues an instruction relating to behavior of the vehicle based on the action plan generated by the generation section to a drive source controller that controls a drive source of the vehicle; and a comparison section that compares predicted behavior of the vehicle based on the instruction issued by the first notification section and actual behavior of the vehicle detected by a detection section; a second notification section that, in cases where the predicted behavior of the vehicle and the actual behavior of the vehicle compared by the comparison section differ by more than a preset range, issues, to a supply device which supplies an energy source of at least one of fuel or electric power to the drive source which supplies electric power to the drive source controller, at least one out of an instruction to cut off the supply of the energy source to the drive source or an instruction to cut off the supply of electric power to the drive source controller.

In a fourteenth aspect of the present disclosure, a vehicle control method includes, with an onboard computer: generating a automated drive action plan for a vehicle; issuing an instruction relating to behavior of the vehicle based on the generated action plan to a drive source controller that controls a drive source of the vehicle; comparing predicted behavior of the vehicle based on the issued instruction and detected actual behavior of the vehicle; and issuing an instruction to decelerate the vehicle to a brake device of the vehicle in cases where the compared predicted behavior of the vehicle and actual behavior of the vehicle differ by more than a preset range.

In a fifteenth aspect of the present disclosure, a vehicle control method includes, with an onboard computer: generating a automated drive action plan for the vehicle; issuing an instruction relating to behavior of the vehicle based on the generated action plan to a drive source controller that controls a drive source of the vehicle; comparing predicted behavior of the vehicle based on the issued instruction and detected actual behavior of the vehicle; and, in cases where the compared predicted behavior of the vehicle and actual behavior of the vehicle differ by more than a preset range, issuing, to a supply device, which supplies an energy source of at least one of fuel or electric power to the drive source and which supplies electric power to the drive source controller, at least one out of an instruction to cut off the supply of the energy source to the drive source or an instruction to cut off the supply of electric power to the drive source controller.

In a sixteenth aspect of the present disclosure, a vehicle control program causes an onboard computer to: generate a automated drive action plan for a vehicle; issue an instruction relating to behavior of the vehicle based on the generated action plan to a drive source controller that controls a drive source of the vehicle; compare predicted behavior of the vehicle based on the issued instruction and detected actual behavior of the vehicle; and issue an instruction to decelerate the vehicle to a brake device of the vehicle in cases where the compared predicted behavior of the vehicle and actual behavior of the vehicle differ by more than a preset range.

In a seventeenth aspect of the present disclosure, a vehicle control program causes an onboard computer to: generate a automated drive action plan for the vehicle; issue an instruction relating to behavior of the vehicle based on the generated action plan to a drive source controller that controls a drive source of the vehicle; compare predicted behavior of the vehicle based on the issued instruction and detected actual behavior of the vehicle; and, in cases where the compared predicted behavior of the vehicle and actual behavior of the vehicle differ by more than a preset range, issue, to a supply device, which supplies an energy source of at least one of fuel or electric power to the drive source and which supplies electric power to the drive source controller, at least one out of an instruction to cut off the supply of the energy source to the drive source or an instruction to cut off the supply of electric power to the drive source controller. In the above explanation of the exemplary aspects of embodiment, specific elements with their reference numerals are indicated by using brackets. These specific elements are presented as mere examples in order to facilitate understanding, and thus, should not be interpreted as any limitation to the accompanying claims.

According to the first, twelfth, fourteenth, and sixteenth aspects of the present disclosure, the operational state of the drive source controller that controls the drive source is monitored by the automated drive controller, and in cases where an abnormality has occurred in the drive source controller, an instruction to decelerate the vehicle is issued from the automated drive controller to the brake device. Even when unintended vehicle behavior has occurred in the automated drive mode, enough time for transitioning from the automated drive mode to manual driving mode of the vehicle can thereby be appropriately secured. Accordingly, safety of the vehicle can be further increased.

Moreover, according to the first, twelfth, fourteenth, and sixteenth aspects of the present disclosure, even in cases where the drive source or the drive source controller does not meet a high safety standard required for automated drive (for example, ASIL D, described below), due to using a automated drive controller that does meet the high safety standard required for automated drive to realize both monitoring of the drive source controller and deceleration control of the vehicle if an abnormality has occurred in the drive source controller, the vehicle as a whole is capable of meeting the high safety standard required for automated drive. In other words, the high safety standard required for automated drive can be met with regards to the drive source and the drive source controller even when an existing drive source or drive source controller is employed. The development cost, the development time, and the like of the vehicle can thereby be improved.

According to the second aspect of the present disclosure, the vehicle can be decelerated by the brake device, and enough time until transitioning to driver control of the vehicle can be appropriately secured, even when unintended, sudden acceleration of the vehicle has occurred. Vehicle safety can thereby be further increased.

According to the third aspect of the present disclosure, a high level of redundancy of the automated drive controller is secured through the use of plural second processors. Vehicle safety can be further increased by using a automated drive controller in which such a high level of redundancy has been secured to realize monitoring of the drive source controller and deceleration control of the vehicle in cases where an abnormality has occurred in the drive source controller.

According to the fourth aspect to the sixth aspect of the present disclosure, even when objects (for example, nearby vehicles, parked vehicles, pedestrians, guard rails, and utility poles) are present nearby the vehicle, deceleration control of the vehicle is realized with consideration given to such objects. Vehicle safety can thereby be further increased.

According to the ninth aspect of the present disclosure, content prompting transition from the automated drive mode to the manual driving mode is output from the output device in cases where an abnormality has occurred in the drive source controller. The time until transitioning to driver control of the vehicle can thereby be shortened.

According to the tenth aspect of the present disclosure, an instruction to decelerate the vehicle that has been issued to the brake device is cancelled when a transition has been made from the automated drive mode to the manual driving mode. The level of driver control, after transitioning to driver control of the vehicle, can thereby be increased. Vehicle safety can thereby be further increased.

According to the seventh, eighth, eleventh, thirteenth, fifteenth, and seventeenth aspects of the present disclosure, the operational state of the drive source controller that controls the drive source is monitored by the automated drive controller, and in cases where an abnormality has occurred in the drive source controller, an instruction to cut off the supply of the energy source to the drive source, or an instruction to cut off the supply of electric power to the drive source controller, is issued from the automated drive controller to the supply device, and the deceleration of the vehicle is planned. Enough time until transitioning to driver control of the vehicle can thereby be appropriately secured, even when unintended vehicle behavior has occurred in the automated drive mode. Accordingly, safety of the vehicle can be further increased.

Moreover, according to the seventh, eighth, eleventh, thirteenth, fifteenth, and seventeenth aspects of the present disclosure, even when the drive source controller does not meet a high safety standard required for automated drive (for example, ASIL D, described below), due to using a automated drive controller that does meets the high safety standard required for automated drive to realize both monitoring of the drive source controller and deceleration control of the vehicle if an abnormality has occurred in the drive source controller, the vehicle as a whole is capable of meeting the required high safety standard for automated drive. In other words, the high safety standard required for automated drive can be met with regards to the drive source and the drive source controller even when an existing drive source or drive source controller is employed. The development cost, the development time, and the like of the vehicle can thereby be improved.

BRIEF DESCRIPTION OF THE DRAWINGS

The advantages of the disclosure will become apparent in the following description taken in conjunction with the following drawings.

DETAILED DESCRIPTION

Figure 1:
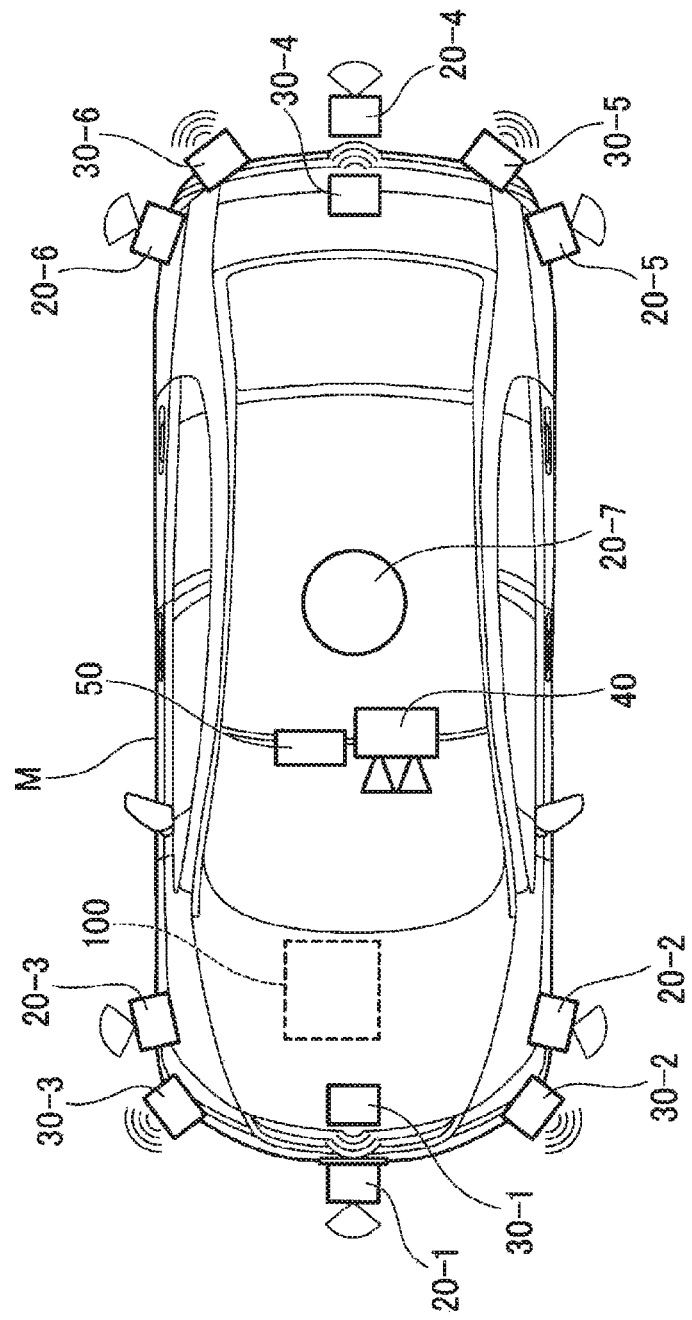
FIG. 1 is diagram illustrating configuration elements of a vehicle (vehicle M) according to an embodiment.

Explanation follows regarding an embodiment of a vehicle, a vehicle controller, a vehicle control method, and a medium storing a vehicle control program of the present disclosure, with reference to the drawings.
Vehicle Configuration FIG. 1 is a diagram illustrating configuration elements included in a vehicle (referred to below as vehicle M) according to an embodiment. The vehicle M is, for example, a two-wheeled, three-wheeled, or four-wheeled automobile, and may be automobile with an (internal combustion) engine such as a diesel engine or a gasoline engine configuring a drive source 81, described below, an electric automobile with a traction motor (an electric motor) configuring the drive source 81, a hybrid automobile provided with both an engine and a traction motor for the drive source 81, or the like. The electric automobile described above is, for example, driven using power discharged by a battery such as a secondary cell, a hydrogen fuel cell, a metal fuel cell, or an alcohol fuel cell.

As illustrated in FIG. 1, the vehicle M is equipped with finders 20-1 to 20-7, radar units 30-1 to 30-6, a sensor such as a camera 40, a navigation device 50, and a automated drive Electronic Control Unit (ECU) 100, this being an example of both a "vehicle controller" and a "automated drive controller." The finders 20-1 to 20-7 are, for example, LIDAR (Light Detection and Ranging, or Laser Imaging Detection and Ranging) units that measure the scattering of emitted light, and measure the distance to a target. As an example, the finder 20-1 is attached to a front grille or the like, and the finders 20-2 and 20-3 are, for example, attached to side faces of the vehicle body, to door mirrors, inside front headlights, or in the vicinity of side lights. The finder 20-4 is attached to a trunk lid or the like, and the finders 20-5 and 20-6 are attached to side faces of the vehicle body or inside taillights, for example. The finders 20-1 to 20-6 described above have, for example, a detection range of 150° in the horizontal direction. The finder 20-7 is attached to the roof, for example. The finder 20-7, for example, has a detection range of 360° in the horizontal direction.

The radar units 30-1 and 30-4 described above are, for example, long range millimeter wave radar units that have a wider detection range than the other radar units in the depth direction. The radar units 30-2, 30-3, 30-5, and 30-6 are intermediate range millimeter wave radar units that have a narrower detection range than the radar units 30-1 and 30-4 in the depth direction. In the following, finders 20-1 to 20-7 are denoted simply as "finders 20" when no particular distinction is being made, and radar units 30-1 to 30-6 are denoted simply as "radar units 30" when no particular distinction is being made. The radar units 30 detect objects using a frequency-modulated continuous-wave (FM-CW) method, for example.

The camera 40 is, for example, a digital camera utilizing a solid-state imaging element such as a charge-coupled device (CCD) or a complementary metal-oxide-semiconductor (CMOS) element. The camera 40 is, for example, attached to an upper portion of the front windshield or the back face of the rear view mirror. The camera 40 periodically and repeatedly images the front of the vehicle M, for example.

Note that the configuration illustrated in FIG. 1 is merely an example, and part of this configuration may be omitted, and other configuration may be added.

Figure 2:
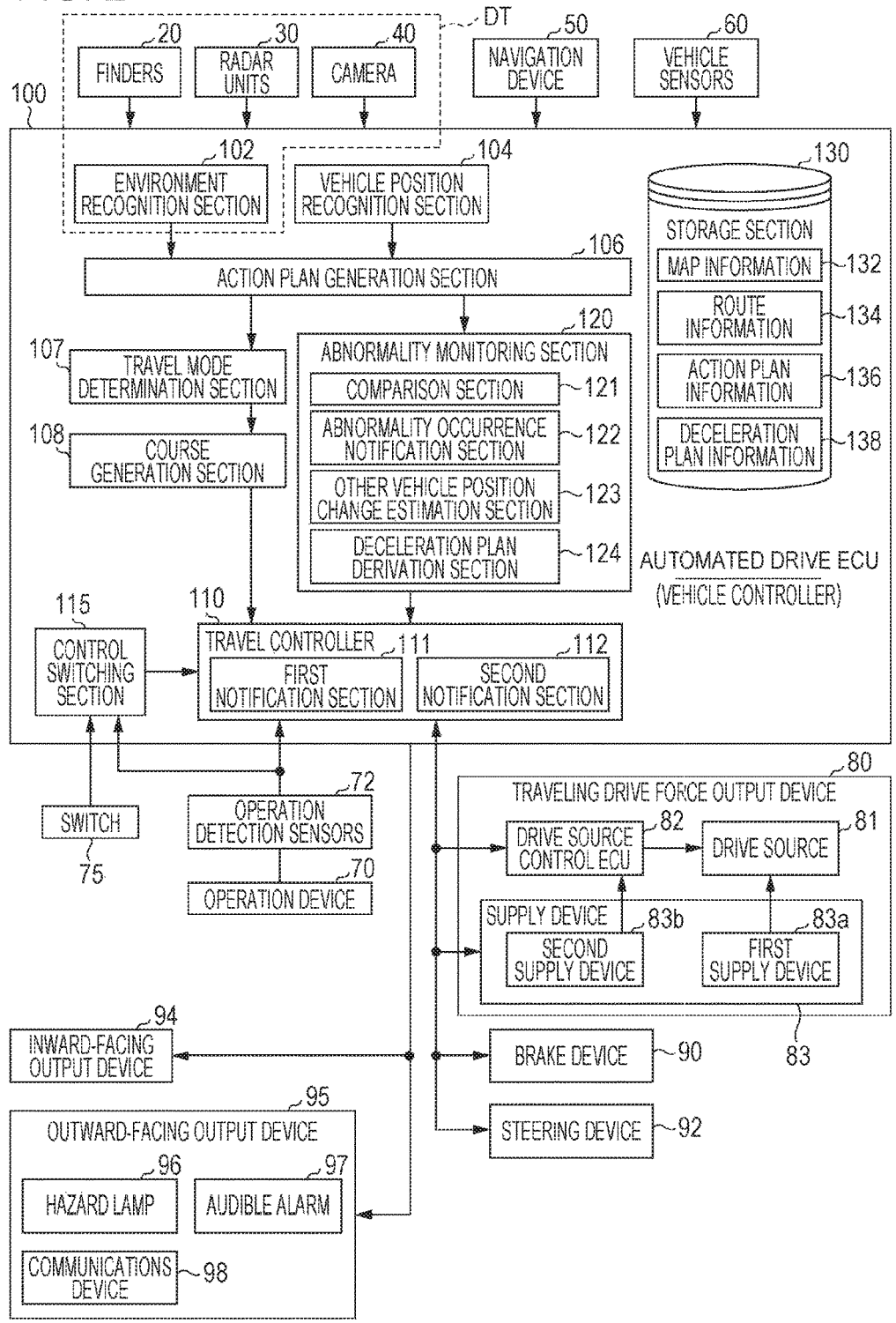
FIG. 2 is a functional configuration diagram of a vehicle M according to an embodiment.

FIG. 2 is a functional configuration diagram of the vehicle M according to the present embodiment. In addition to the finders 20, the radar units 30, and the camera 40, the vehicle M is equipped with a navigation device 50, vehicle sensors 60, an operation device 70, operation detection sensors 72, a switch 75, a traveling drive force output device 80, a brake device 90, a steering device 92, an inward-facing output device 94, an outward-facing output device 95, and a automated drive ECU 100.

The navigation device 50 includes a global navigation satellite system (GNSS) receiver and map information (navigation map), a touch-panel display that functions as a user interface, a speaker, a microphone, and the like. The navigation device 50 identifies the position of the vehicle M using the GNSS receiver, and derives a route from this position to a destination designated by a user. The route derived by the navigation device 50 is stored in a storage section 130 as route information 134. The position of the vehicle M may be identified, or finalized, by using an inertial navigation system (INS) that utilizes output from the vehicle sensors 60. While executing a manual driving mode, the navigation device 50 provides guidance using speech and navigational display of the route to the destination. Note that configuration for identifying the position of the vehicle M may be provided independently of the navigation device 50. The navigation device 50 may be realized, for example, by one function of a terminal device such as a smartphone or a tablet terminal in the possession of the user. In such cases, information is exchanged using wireless or wired communication between the terminal device and the automated drive ECU 100.

The vehicle sensors 60 (first detection section) detect the actual behavior of the vehicle M. "Actual behavior" in the present disclosure means, for example, the actual behavior of the vehicle M detected by a sensor or the like. The vehicle sensors 60 include, for example, a vehicle speed sensor that detects the speed (vehicle speed) of the vehicle M, an acceleration sensor that detects acceleration, a yaw rate sensor that detects angular acceleration about a vertical axis, and a direction sensor that detects the orientation of the vehicle M. The vehicle sensors 60 thereby detect the actual speed and the actual acceleration of the vehicle M. "Actual speed" in the present disclosure means the actual speed of the vehicle M detected by a sensor or the like. "Actual acceleration" in the present disclosure means the actual acceleration of the vehicle M detected by a sensor or the like. Note that the speed sensor and the acceleration sensor may, for example, be a wheel speed sensor that detects the speed and acceleration of the vehicle M by measuring the wheel speed of the vehicle M, a yaw/g-sensor in which a yaw rate sensor and an acceleration sensor are provided together as one unit, or a sensor that detects the speed and the acceleration of the vehicle M based on information received from an external communications device such as a Global Positioning System (GPS) satellite.

The operation device 70 includes, for example, an accelerator pedal, a steering wheel, a brake pedal, and a shift lever. Operation detection sensors 72 that detect the presence or absence of operation and an amount of operation by a driver are attached to the operation device 70. The operation detection sensors 72 include, for example, an accelerator opening sensor, a steering torque sensor, a brake sensor, and a shift position sensor. The operation detection sensors 72 output the degree of accelerator opening, steering torque, brake depression amount, shift position, and the like as detection results to a travel controller 110. Note that, alternatively, the detection results of the operation detection sensors 72 may be directly output to the traveling drive force output device 80, the brake device 90, or the steering device 92, and the like.

The switch 75 is a switch operated by a driver or the like. The switch 75 may be a mechanical switch, or may be a graphical user interface (GUI) switch provided to the touch-panel display of the navigation device 50. The switch 75 receives an instruction to switch between a manual driving mode in which a driver manually drives and a automated drive mode in which the vehicle M travels in a state having no driver-performed operation (alternatively, a state in which the amount of operation is smaller, or the frequency of operation is lower, than that of the manual driving mode, that is, assisted-driving mode can be included), and generates a control mode designation signal that designates a control mode by the travel controller 110 to be either one of a automated drive mode or a manual driving mode.

The traveling drive force output device 80 includes the drive source 81, a drive source control ECU 82, and a supply device 83. The drive source 81 is a drive force generation device that causes the vehicle M to generate a drive force (torque). As described above, the drive source 81 includes one or both out of an engine, such as a diesel engine or a gasoline engine, or a traction motor.

The drive source control ECU 82 (drive source controller) is a controller that controls the drive source 81. For example, the drive source control ECU 82 controls the drive source 81 based on an instruction issued from the travel controller 110 described below. The drive source control ECU 82 may be an engine ECU that controls the engine in cases where the drive source 81 includes an engine. The engine ECU, for example, controls the speed, acceleration, and the like of the vehicle M by adjusting the throttle opening, shift stage, and the like, in accordance with information input from the travel controller 110. A fuel injection ECU (FI-ECU) that controls the amount of fuel injected into the engine and injection timings thereof, is an example of the engine ECU. The drive source control ECU 82 may be a motor ECU that drives the traction motor in cases where the drive source 81 only includes a traction motor. The motor ECU, for example, controls the speed, acceleration, and the like of the vehicle M by adjusting the duty ratio of a PWM signal given to the traction motor. The drive source control ECU 82 may include both the engine ECU and the motor ECU in cases where the drive source 81 includes both an engine and a traction motor.

Figure 3:
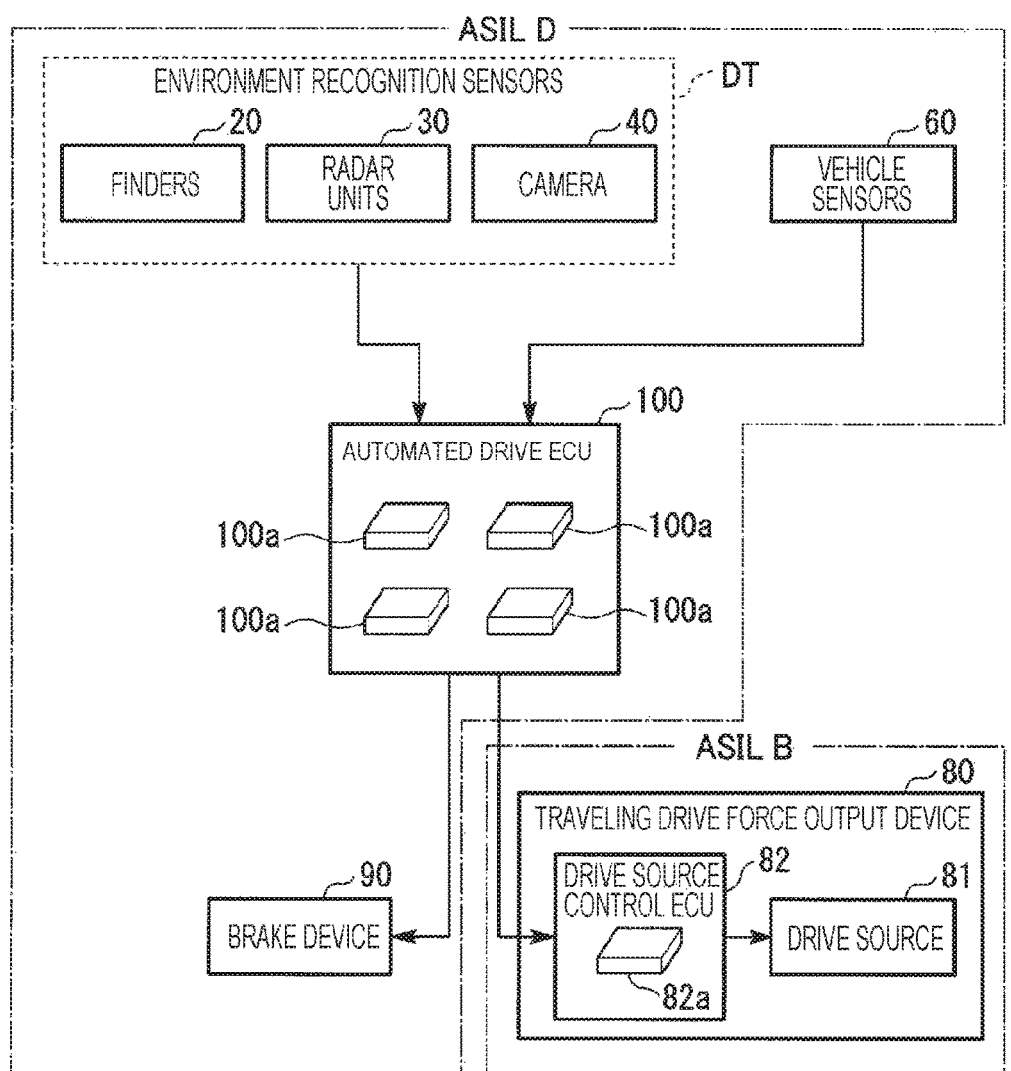
FIG. 3 is a diagram illustrating a hardware configuration of part of a vehicle M according to an embodiment.

FIG. 3 is a diagram illustrating a hardware configuration of part of the vehicle M according to the present embodiment. As illustrated in FIG. 3, the drive source control ECU 82 includes at least one processor (first processor) 82*a* capable of executing a program. "Processor" in the present disclosure means, for example, a hardware chip component (packaged component) such as a microcomputer. The processor 82*a*, for example, controls the drive source 81 based on an instruction issued from the travel controller 110 by reading and executing a pre-stored program. The drive source control ECU 82 is formed as a separate piece of hardware from the automated drive ECU 100 described below. For example, physically separated configuration is preferable for safety purpose. Namely, the drive source control ECU 82 and the automated drive ECU 100 are separate chip components (packaged components). Seen from another perspective, the drive source control ECU 82 and the automated drive ECU 100 are electrically connected to each other, such as through a signal line or a cable provided to a circuit board upon which at least one of the drive source control ECU 82 or the automated drive ECU 100 are mounted.

As illustrated in FIG. 2, The supply device 83 includes a first supply device 83*a* and a second supply device 83*b*. The first supply device 83*a* supplies an energy source, this being at least one of fuel or electric power, to the drive source 81. For example, in cases where the drive source 81 includes an engine, the first supply device 83*a* includes a fuel tank that stores fuel used to drive the engine, and a fuel supply line (fuel supply pipe) that sends fuel inside the fuel tank to the engine, and the first supply device 83*a* supplies fuel to the drive source 81. In such cases, the first supply device 83*a* includes a cutoff that cuts off the supply of fuel to the drive source 81. The cutoff is capable of being actuated based on a control instruction issued from the travel controller 110.

In cases where the drive source 81 includes a traction motor, the first supply device 83*a* includes a battery charged with electricity used to drive the traction motor, and a power cable that sends electricity stored in the battery to the traction motor, and the first supply device 83*a* supplies electric power to the drive source 81. In such cases, the first supply device 83*a* includes a cutoff that cuts off the supply of electric power to the drive source 81. The cutoff is capable of being actuated based on a control instruction issued from the travel controller 110.

The second supply device 83*b* supplies the electric power used to operate the drive source control ECU 82 to the drive source control ECU 82. For example, the second supply device 83*b* includes a power cable that sends part of the electricity stored in the battery to the drive source control ECU 82. The second supply device 83*b* includes a cutoff that cuts off the supply of electric power to the drive source control ECU 82. The cutoff is capable of being actuated based on a control instruction issued from the travel controller 110.

Note that the first supply device 83*a* and the second supply device 83*b* may be provided together as a single unit, or may be provided separately and disposed at a separation from each other. In the present disclosure, for the ease of explanation, the first supply device 83*a* and the second supply device 83*b* are collectively referred to as a "supply device."

The traveling drive force output device 80 explained above that includes the drive source 81, the drive source control ECU 82, and the supply device 83, is designed so as to meet, for example, the level B (ASIL B) standard of the Automotive Safety Integrity Level (ASIL) safety standard defined by ISO 26262.

The brake device 90 is, for example, an electric servo brake device that includes a brake caliper, a cylinder that transmits hydraulic pressure to the brake caliper, an electric motor that causes the cylinder to generate hydraulic pressure, and a controller. The controller of the electric servo brake device is configured to control the electric motor in accordance with information input from the travel controller 110, and to output brake torque that accords with a control operation to each wheel. The electric servo brake device may include a backup mechanism that transmits hydraulic pressure generated by operation of the brake pedal to the cylinder through a master cylinder. Note that the brake device 90 is not limited to the electric servo brake device explained above, and may be an electronically controlled hydraulic brake device. The electronically controlled hydraulic brake device controls an actuator in accordance with information input from the travel controller 110 so as to transmit hydraulic pressure from the master cylinder to the cylinder.

The steering device 92 includes, for example, an electric motor that applies force to a rack and pinion mechanism or the like so as to be capable of a changing a steering wheel orientation, a steering angle sensor or the like that detects a steering angle of the steering wheel (or an actual steering angle). The steering device 92 drives the electric motor based on information input from the travel controller 110.

The inward-facing (internally-oriented) output device 94 outputs an output that is recognizable by a driver of the vehicle M (such as a sound, image, or video). The inward-facing output device 94 may be a speaker installed inside the vehicle, or may be the display of the navigation device 50. In cases where the automated drive ECU 100 has detected an abnormality in the traveling drive force output device 80, the inward-facing output device 94 outputs content prompting the driver of the vehicle M to the switch from the automated drive mode to the manual driving mode based on a control instruction issued from the automated drive ECU 100.

The outward-facing (externally-oriented) output device 95 outputs an output recognizable by nearby vehicles or the occupants of nearby vehicles, described below. In cases where the automated drive ECU 100 has detected an abnormality in the traveling drive force output device 80, the outward-facing output device 95 informs nearby vehicles or the occupants of nearby vehicles of an abnormality of the vehicle M based on a control instruction issued from the automated drive ECU 100. For example, the outward-facing output device 95 includes at least one of a hazard lamp 96, an audible alarm (horn) 97, or a communications device 98. In cases where the automated drive ECU 100 has detected an abnormality in the traveling drive force output device 80, the outward-facing output device 95 may illuminate the hazard lamp 96 or sound the audible alarm 97 to inform nearby vehicles or the occupants of nearby vehicles of an abnormality of the vehicle M. The communications device 98 includes an antenna and a wireless circuit that is electrically connected to the antenna. The communications device 98 enables wireless communication between the vehicle M and nearby vehicles (inter-vehicle communication). In cases where the automated drive ECU 100 has detected an abnormality in the traveling drive force output device 80, the outward-facing output device 95 may inform nearby vehicles of an abnormality of the vehicle M using the communications device 98.

Vehicle Controller

Explanation follows regarding the automated drive ECU 100. As illustrated in FIG. 2, the automated drive ECU 100 includes an environment recognition section 102, a vehicle position recognition section 104, an action plan generation section 106, a travel mode determination section 107, a course generation section 108, the travel controller 110, a control switching section 115, an abnormality monitoring section 120, and a storage section 130. Some or all out of the environment recognition section 102, the vehicle position recognition section 104, the action plan generation section 106, the travel mode determination section 107, the course generation section 108, the travel controller 110, the control switching section 115, and the abnormality monitoring section 120 are software modules that function by means of a processor, such as a central processing unit (CPU), executing a program. Moreover, some or all out of these sections may be hardware modules such as large-scale integrated (LSI) circuits or application specific integrated circuits (ASIC). The storage section 130 may be realized by read-only memory (ROM), random-access memory (RAM), a hard disk drive (HDD), flash memory, or the like. The program may be pre-stored in the storage section 130, or may be downloaded from an external device through onboard internet equipment or the like. The program may also be installed in the storage section 130 by loading a portable storage medium stored with the program into a drive device, not illustrated in the drawings.

The environment recognition section 102 recognizes states such as the position and speed of nearby vehicles based on output from the finders 20, the radar units 30, the camera 40, and the like. In the present embodiment, nearby vehicles refers to vehicles that are traveling nearby the vehicle M, and that are traveling in the same direction as the vehicle M. The positions of nearby vehicles may be indicated by representative points such as the centers of mass or corners of other vehicles, or may be indicated by regions expressed by the wheels of other vehicles. The "state" of a nearby vehicle may include the acceleration of the nearby vehicle or whether or not the nearby vehicle is changing lanes (or attempting to change lanes) based on information from the various devices described above. For example, the environment recognition section 102 recognizes whether or not a nearby vehicle is changing lanes (or attempting to change lanes) based on a position history, an operational status of the turn signals, or the like of the nearby vehicle. The nearby vehicles are examples of objects positioned nearby the vehicle M. The environment recognition section 102 recognizes the position of parked vehicles, pedestrians, guard rails, utility poles, and other objects as objects positioned nearby the vehicle M. In the following, the combination of the finders 20, the radar units 30, the camera 40, and the environment recognition section 102 is referred to as a "detection section DT (second detection section)" that detects objects positioned nearby the vehicle M. The detection section DT may also recognize states such as the position and speed of nearby vehicles by communicating with the nearby vehicles.

Figure 4:
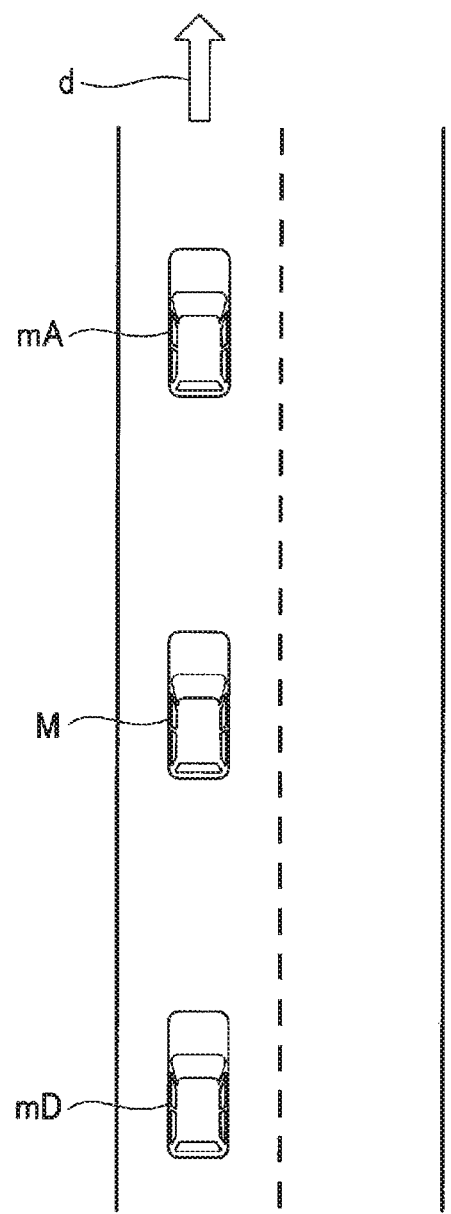
FIG. 4 is a diagram illustrating an example relationship between a vehicle M and nearby vehicles.

FIG. 4 is a diagram illustrating an example of a relationship between the vehicle M and nearby vehicles. For example, the detection section DT detects a preceding vehicle in front mA traveling directly in front of the vehicle M, and a succeeding vehicle behind mD traveling directly behind the vehicle M, as nearby vehicles. Namely, the detection section DT recognizes states such as the positions and speeds of the vehicle in front mA and the vehicle behind mD based on output from the finders 20, the radar units 30, the camera 40, and the like.

Figure 5:
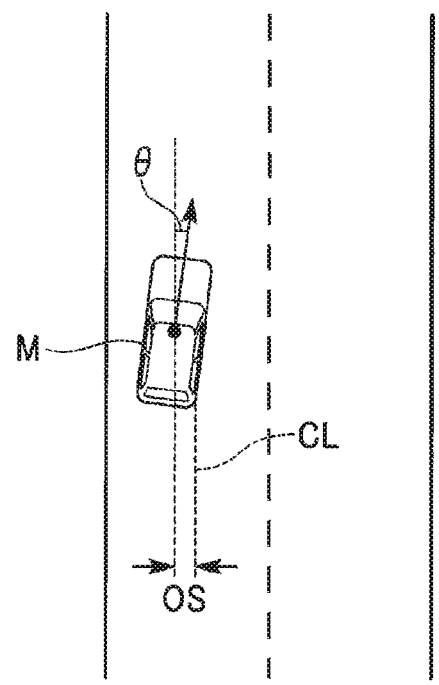
FIG. 5 is a diagram illustrating a manner in which the relative position of a vehicle M is recognized with respect to a lane of travel by a vehicle position recognition section 104.

The vehicle position recognition section 104 recognizes the lane in which the vehicle M is traveling (current lane) and the relative position of the vehicle M with respect to the lane of travel based on map information 132 stored in the storage section 130, and information input from the finders 20, the radar units 30, the camera 40, the navigation device 50, or the vehicle sensors 60. The map information 132 is, for example, map information that is more precise than the navigation map included in the navigation device 50, and includes information relating to the lane centers, information relating to lane boundaries, or the like. FIG. 5 is a diagram illustrating a way in which the relative position of the vehicle M is recognized with respect to a lane of travel by the vehicle position recognition section 104. The vehicle position recognition section 104 recognizes, for example, a deviation OS of a reference point (for example, the center of mass) of the vehicle M from the center CL of a lane of travel, and an angle θ formed between the traveling direction of the vehicle M and a line aligned with the center CL, as the relative position of the vehicle M with respect to the lane of travel. Note that, alternatively, the vehicle position recognition section 104 may recognize the position of reference point of the vehicle M, with respect to either of the side end portions of the current lane, as the relative position of the vehicle M with respect to the lane of travel.

The action plan generation section 106 generates a automated drive action plan for specific sections. Specific sections refers to, for example, sections that pass through toll roads such as expressways in the route derived by the navigation device 50. Note that there is no limitation thereto, and the action plan generation section 106 may generate an action plan for a freely selected section.

The action plan is, for example, configured by plural events that are sequentially executed. Events include, for example, a deceleration event in which the vehicle M is decelerated, an acceleration event in which the vehicle M is accelerated, a lane keep event in which the vehicle M is driven so as not to leave the lane of travel, a lane change event in which the lane of travel is changed, a passing event in which the vehicle M is caused to overtake a vehicle in front mA, a junction event in which the vehicle M is caused to change to a desired lane at a junction point or the vehicle M is driven so as not to leave the current lane of travel, and a merge event in which the vehicle M is accelerated or decelerated at a lane merging point and the lane of travel is changed. For example, in cases where a junction (junction point) is present on a toll road (for example, an expressway or the like), it is necessary for the automated drive ECU 100 to change lanes such that the vehicle M progresses in the direction of the destination, or maintain its lane, in the automated drive mode. Accordingly, in cases where the map information 132 is referenced and a junction is determined to be present on the route, the action plan generation section 106 sets a lane change event between the current position (coordinate) of the vehicle M and the position (coordinate) of the junction in order to change lanes into a desired lane that enables progression in the direction of the destination.

Figure 6:
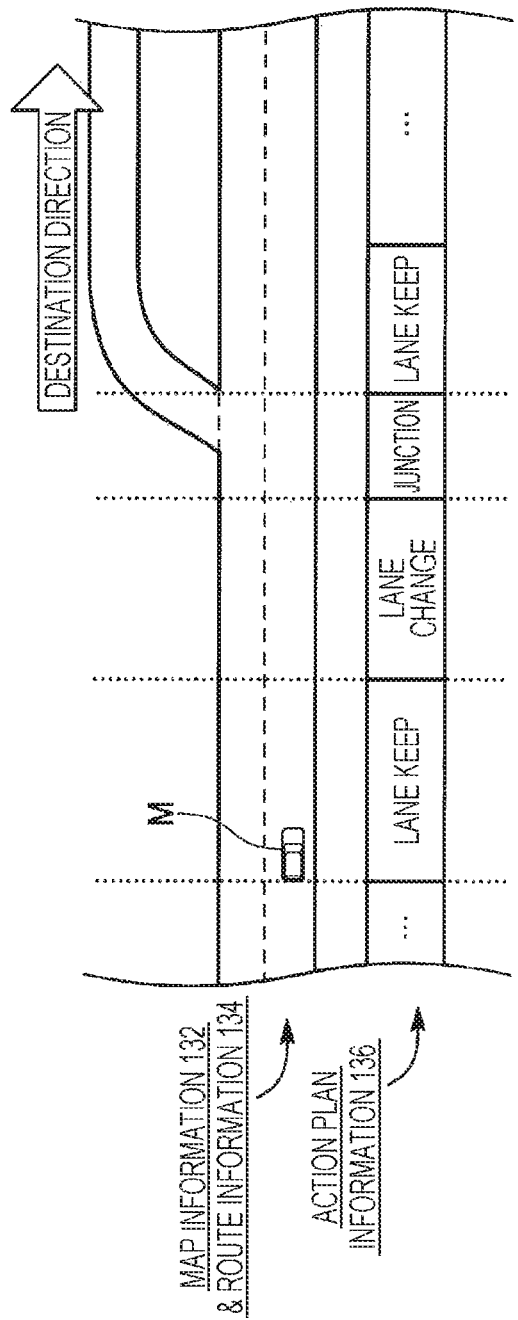
FIG. 6 is a diagram illustrating an example of an action plan generated for given sections.

FIG. 6 is a diagram illustrating an example of an action plan generated for given sections. As illustrated in the drawing, the action plan generation section 106 classifies situations that arise when traveling along a route to a destination, and generates an action plan such that events adapted to each situation are executed. Note that the action plan generation section 106 may dynamically change the action plan according to changes in conditions of the vehicle M.

The travel mode determination section 107 determines a travel mode that is one out of constant speed travel, following travel, decelerating travel, curve travel, and obstacle avoiding travel when a lane keeping event included in the action plan generated by the action plan generation section 106 is implemented by the travel controller 110. For example, the travel mode determination section 107 determines the travel mode to be constant speed travel in cases where a vehicle in front mA is not present in front of the vehicle M. The travel mode determination section 107 determines the travel mode to be following travel in cases such as in which a vehicle in front mA is to be followed. The travel mode determination section 107 determines the travel mode to be decelerating travel in cases where deceleration of a vehicle in front mA has been recognized by the environment recognition section 102 or when implementing an event such as stopping or parking. The travel mode determination section 107 determines the travel mode to be curve travel in cases where the environment recognition section 102 or the vehicle position recognition section 104 has recognized that the vehicle M is approaching a curved road. The travel mode determination section 107 determines the travel mode to be obstacle avoiding travel in cases where an obstacle in front of the vehicle M has been recognized by the environment recognition section 102.

The course generation section 108 generates a target course for the vehicle M based on the travel mode determined by the travel mode determination section 107. A target course is a collection of points (a path) obtained by sampling future target positions that are anticipated to be reached at specific time intervals, in cases where the vehicle M is traveling based on the travel mode determined by the travel mode determination section 107. For example, the course generation section 108 calculates a target speed for the vehicle M based on the speed of a vehicle in front mA present in front of the vehicle M recognized by the environment recognition section 102 and the vehicle position recognition section 104, and based on the distance between the vehicle M and the vehicle in front mA. The course generation section 108 generates the target course based on a calculated target speed. Note that the course generation section 108 may generate a course based on, in addition to the position and speed of a vehicle in front mA, ground points such as merge points on the ground, junction points on the ground, target points on the ground, and objects such as obstacles.

Figure 7D:
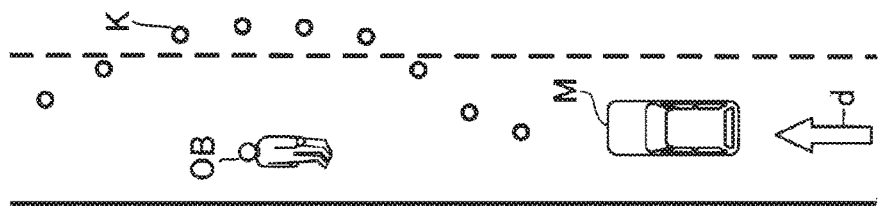
FIGS. 7A to 7D are diagrams illustrating examples of target trajectories generated by a course generation section.
Figure 7C:
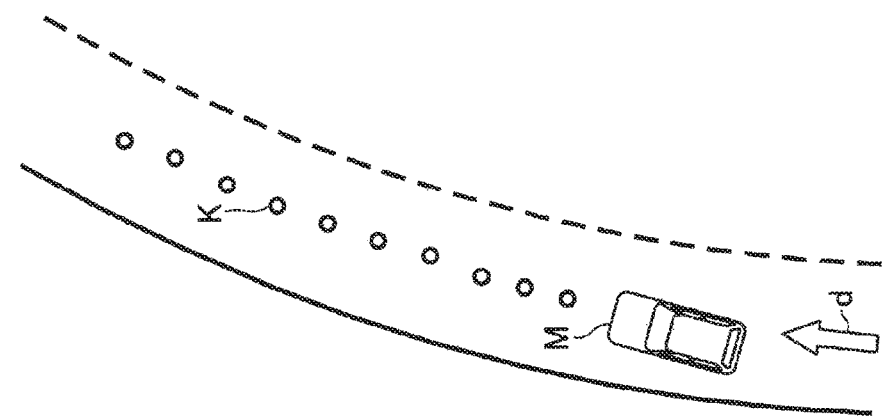
Figure 7B:
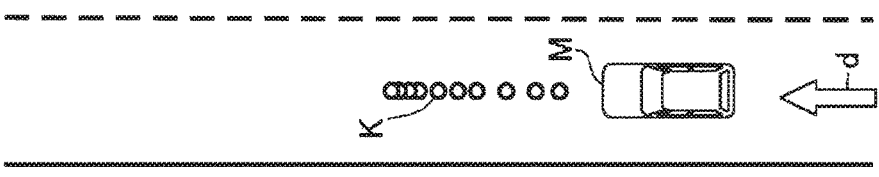
Figure 7A:
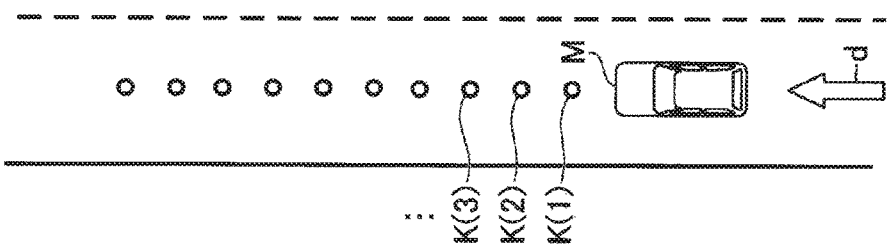

FIG. 7A to FIG. 7D are diagrams illustrating examples of target trajectories generated by the course generation section 108. As illustrated in FIG. 7A, for example, the course generation section 108 sets a future target position such as K(1), K(2), K(3), . . . as the course of the vehicle M each time a specific amount of time Δt has passed starting from the current time, using the present position of the vehicle M as a reference. In the following, these target positions are denoted simply as "target positions K" when no particular distinction is being made. For example, the number of target positions K is set according to a target time T. For example, when the target time T is set to 5 seconds, within these 5 seconds, the course generation section 108 sets target positions K on a central line in the lane of travel at intervals of the specific amount of time Δt (for example, 0.1 seconds), and determines arrangement intervals for these plural target positions K based on the travel mode. The course generation section 108 may, for example, derive the central line in the lane of travel from information related to the width and the like of the lane included in the map information 132, or the course generation section 108 may acquire the central line in the lane of travel from the map information 132 in cases where the position of the central line is included in the map information 132 in advance. For example, as illustrated in FIG. 7A, in cases where the travel mode has been determined to be constant speed travel by the travel mode determination section 107 described above, the course generation section 108 generates the course by setting the plural target positions K with equal intervals.

In cases where the travel mode has been determined to be decelerating travel by the travel mode determination section 107 (including when a vehicle in front mA has decelerated in following travel), the course generation section 108 sets wider intervals between target positions K the earlier the times of arrival and sets narrower intervals between target positions K the later the times of arrival, so as to generate the target course as illustrated in FIG. 7B. In such cases, a vehicle in front mA may be set as a target OB, or, an obstacle other than the vehicle in front mA, or a ground point such as a merge point on the ground, a junction point on the ground, or a target point on the ground, may be set as a target OB. The travel controller 110, described later, thereby decelerates the vehicle M due to placing target positions K having later times of arrival for the vehicle M relatively nearer to the current position of the vehicle M in such cases.

As illustrated in FIG. 7C, in cases where the travel mode has been determined to be curve travel by the travel mode determination section 107, the course generation section 108, for example, arranges plural target positions K in accordance with the curvature of the road while varying the lateral positions (lane width direction positions) of the target positions K with respect to the direction of progress of the vehicle M to generate a target course. As illustrated in FIG. 7D, in cases where an obstacle OB such as a person or a stopped vehicle is present in the road in front of the vehicle M, the travel mode determination section 107 determines the travel mode to be obstacle avoiding travel. In such cases, the course generation section 108 arranges the plural target positions K and generates the target course such that the vehicle M travels avoiding the object.

Figure 8:
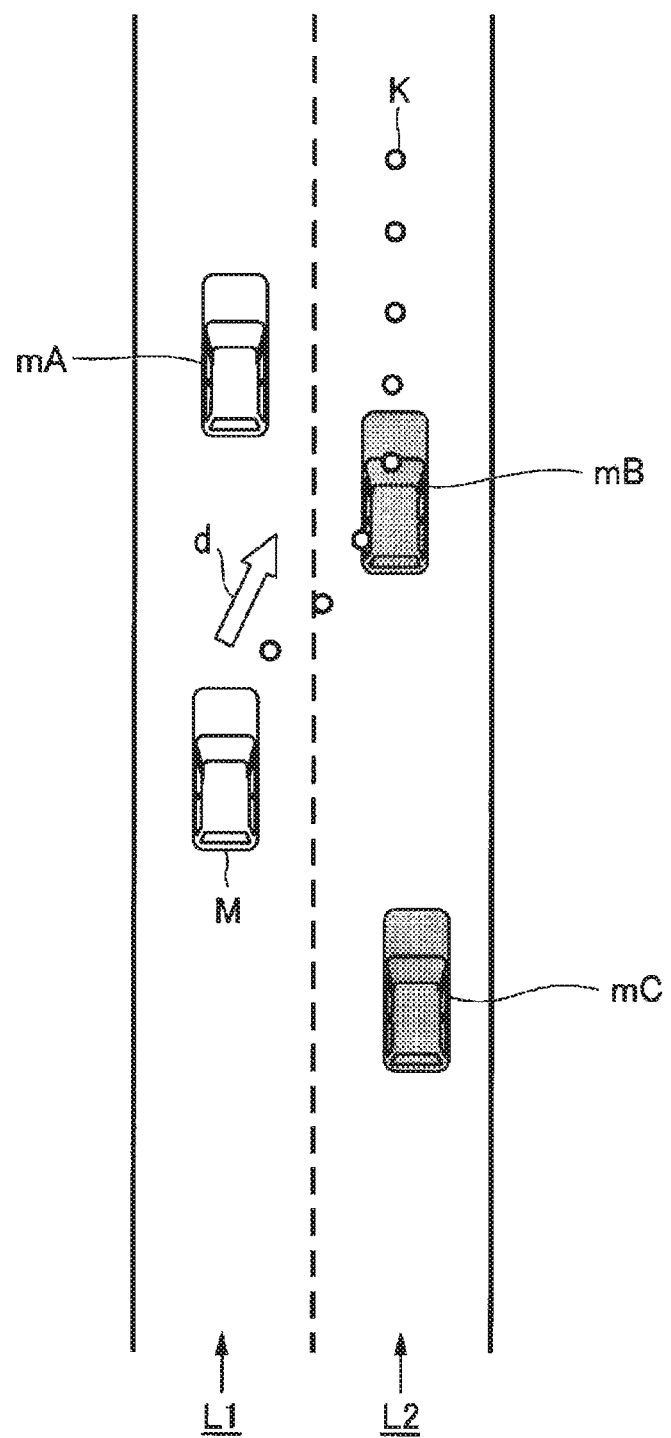
FIG. 8 is a diagram illustrating a way in which a target course for changing lanes is generated.

FIG. 8 is a diagram illustrating a way in which a target course for changing lanes is generated. For example, assuming that a vehicle in front mA, a front reference vehicle mB, and a rear reference vehicle mC are traveling with a specific speed model, and based on the speed model of these three vehicles and the speed of the vehicle M, the course generation section 108 generates a target course such that the vehicle M is positioned between the front reference vehicle mB and the rear reference vehicle mC at a time in the future without interfering with the vehicle in front mA. Note that the front reference vehicle mB is a vehicle traveling in an adjacent lane L2 that is adjacent to the current lane L1, and is a vehicle traveling directly in front of a lane change targeted position. The rear reference vehicle mC is a vehicle traveling in the adjacent lane L2, and is a vehicle traveling directly behind the lane change targeted position. For example, the course generation section 108 employs a polynomial curve such as a spline curve to smoothly link the current position of the vehicle M, the positions of the front reference vehicle mB and the rear reference vehicle mC at a time in the future, the center of the post-lane change lane, and the lane change end point on the ground, and obtains a specific number of target positions K on this curve at equal intervals or at unequal intervals. When this occurs, the course generation section 108 generates a target course such that at least one of the target positions K is disposed at the targeted position.

The travel controller 110 sets the control mode to either the automated drive mode or the manual driving mode using control from the control switching section 115, and controls a control target (for example, the traveling drive force output device 80, the brake device 90, and the steering device 92) in accordance with the set control mode. When in the automated drive mode, the travel controller 110 reads action plan information 136 generated by the action plan generation section 106, and controls the control target based on events included in the read action plan information 136.

More specifically, the travel controller 110 includes a first notification section 111. The first notification section 111 issues an instruction relating to the behavior of the vehicle M based on the action plan generated by the action plan generation section 106 to the drive source control ECU 82 of the traveling drive force output device 80 of. An "instruction relating to the behavior of the vehicle M" is an instruction relating to the speed, acceleration, and the like of the vehicle M for realizing the action plan generated by the action plan generation section 106. For example, the first notification section 111 issues an instruction relating to a requested acceleration of the vehicle M, as an instruction relating to the behavior of the vehicle M, to the drive source control ECU 82. Note that an "instruction relating to a requested acceleration of the vehicle M," for example, may be an instruction issuing a numerical value of a requested acceleration itself, or may be an instruction issuing a control amount (such as the number of engine revolutions or the number of traction motor revolutions) of the drive source 81 for realizing the requested acceleration. The first notification section 111 also issues an instruction relating to a requested steering angle or the like of the vehicle M to the steering device 92. This enables each device (80, 90, 92) of the control target to control itself based on the control instruction issued from the travel controller 110.

When in the manual driving mode, the travel controller 110 controls the control target based on an operation detection signal output by the operation detection sensors 72. For example, the travel controller 110 outputs an operation detection signal output by the operation detection sensors 72 as-is to each device of the control target.

The control switching section 115 switches the vehicle M control mode of the travel controller 110 from the automated drive mode to the manual driving mode, or from the manual driving mode to the automated drive mode, based on an action plan information 136 generated by the action plan generation section 106. The control switching section 115 also switches the vehicle M control mode of the travel controller 110 from the automated drive mode to the manual driving mode, or from the manual driving mode to the automated drive mode, based on a control mode designation signal input from the switch 75. Namely, the control mode of the travel controller 110 can be freely changed by operation of the driver or the like when traveling or when stopped.

The control switching section 115 also switches the vehicle M control mode of the travel controller 110 from the automated drive mode to the manual driving mode based on an operation detection signal input from the operation detections sensors 72. For example, in cases where an operation amount included in the operation detection signal exceeds a threshold value, namely, in cases where the operation device 70 has received an operation with an operation amount exceeding a threshold value, the control switching section 115 switches the control mode of the travel controller 110 from the automated drive mode to the manual driving mode. In other words, in cases where the operation device 70 has received an operation with an operation amount exceeding a threshold value, the control switching section 115 is able to detect this operation as an operation that switches from the automated drive mode to the manual driving mode. For example, when the vehicle M is driving itself under control of the travel controller 110 set to the automated drive mode, in cases where the steering wheel, the accelerator pedal, or the brake pedal is operated by a driver by an operation amount exceeding a threshold value, the control switching section 115 switches the control mode of the travel controller 110 from the automated drive mode to the manual driving mode. Accordingly, a sudden operation by the driver when an object such as a person jumps out into the road or a vehicle in front mA suddenly stops, can immediately switch the automated drive ECU 100 to the manual driving mode without waiting for operation of the switch 75. As a result, the automated drive ECU 100 can respond to driver operation in an emergency, and can increase safety when traveling.

Monitoring of Drive Source Control ECU by Automated Drive ECU

Next, explanation follows regarding the monitoring of the drive source control ECU 82 by the abnormality monitoring section 120 of the automated drive ECU 100. As illustrated in FIG. 2, the abnormality monitoring section 120 of the automated drive ECU 100 includes a comparison section 121, an abnormality occurrence notification section 122, an other vehicle position change estimation section 123, and a deceleration plan derivation section 124.

Figure 9:
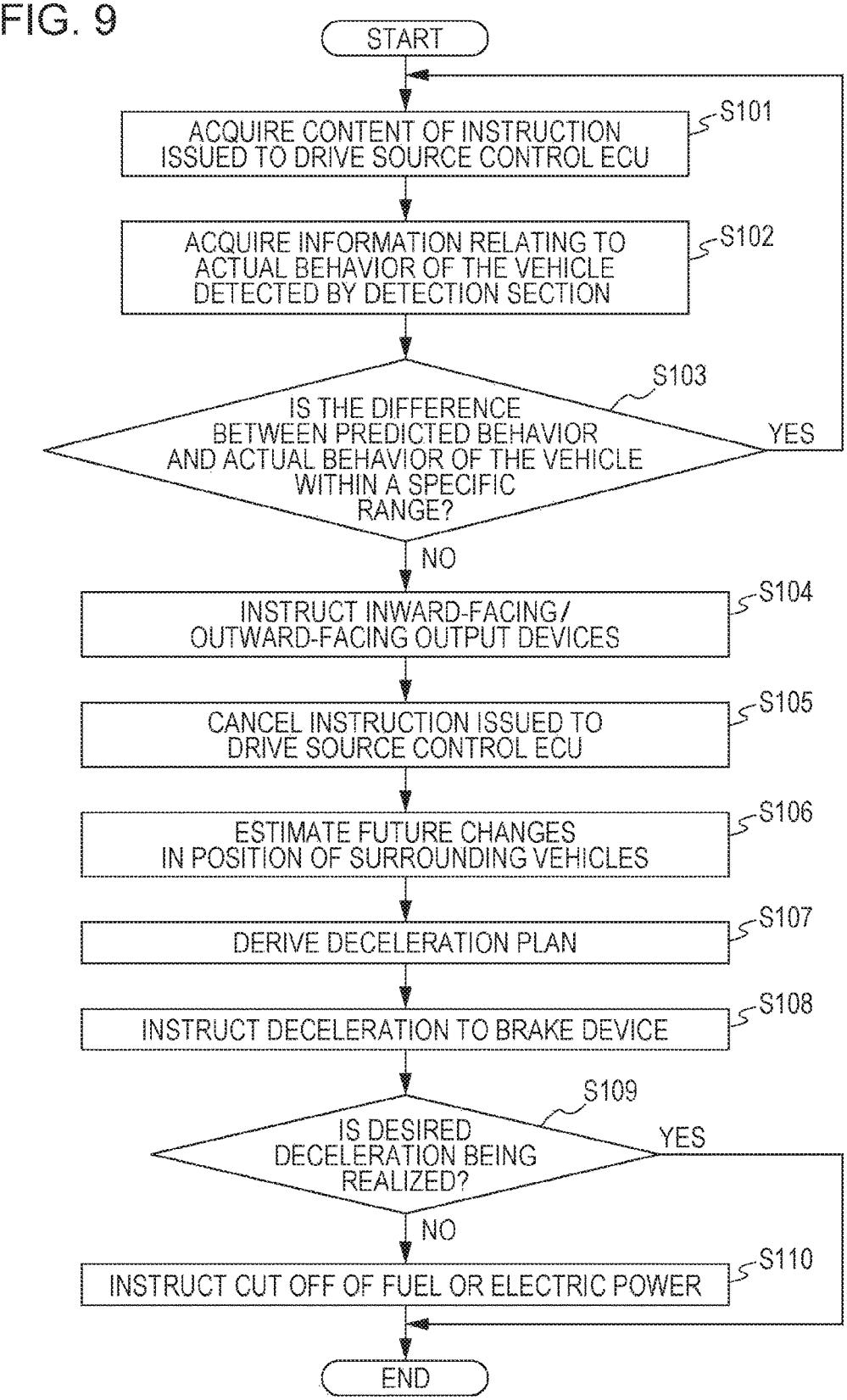
FIG. 9 is a flowchart illustrating an example of a flow of abnormality detection processing by a automated drive ECU according to an embodiment.

In the following, explanation is given regarding monitoring of the drive source control ECU 82 by the abnormality monitoring section 120 and processing if an abnormality in the drive source control ECU 82 has been detected by the abnormality monitoring section 120, with reference to a flowchart. FIG. 9 is a flowchart illustrating an example of a flow of processing during abnormality detection by the abnormality monitoring section 120 in the automated drive mode.

Abnormality Detection

First, the comparison section 121 acquires the content of the instruction relating to behavior of the vehicle M issued by the first notification section 111 of the travel controller 110 to the drive source control ECU 82 (step S101). For example, in cases where an instruction relating to a requested acceleration of the vehicle M has been issued to the drive source control ECU 82 by the first notification section 111, the comparison section 121 acquires the value of the requested acceleration.

Then, the comparison section 121 acquires information relating to the actual behavior of the vehicle M detected by the vehicle sensors 60 (step S102). For example, the comparison section 121 acquires the value of the actual acceleration of the vehicle M detected by the vehicle sensors 60.

Next, the comparison section 121 compares the predicted behavior of the vehicle M, which is predicted based on the instruction issued to the drive source control ECU 82 by the first notification section 111, to the actual behavior of the vehicle M detected by the vehicle sensors 60 (step 3103). Note that "predicted behavior of the vehicle M" refers to the anticipated behavior of the vehicle M based on the instruction issued to the drive source control ECU 82. For example, in cases where information relating to the requested acceleration of the vehicle M is issued to the drive source control ECU 82 by the first notification section 111, the comparison section 121 anticipates that the vehicle M will travel at the requested acceleration as the predicted behavior of the vehicle M. In such cases, as the comparison of the predicted behavior of the vehicle M and the actual behavior of the vehicle M, the comparison section 121 compares the requested acceleration and the actual acceleration of the vehicle M detected by the vehicle sensors 60.

In cases where a difference between the predicted behavior of the vehicle M based on the instruction issued to the drive source control ECU 82 and the actual behavior of the vehicle M detected by the vehicle sensors 60 is within a preset range, the comparison section 121 determines there to be no abnormality in the drive source control ECU 82. For example, the comparison section 121 of the present embodiment compares the requested acceleration of the vehicle M and the actual acceleration of the vehicle M detected by the vehicle sensors 60, and in cases where the difference between the requested acceleration and the actual acceleration of the vehicle M detected by the vehicle sensors 60 is within the preset range, determines there to be no abnormality in the drive source control ECU 82. In cases where it has been determined that there is no abnormality in the drive source control ECU 82, the abnormality monitoring section 120 once again returns to step S101. The abnormality monitoring section 120 then repeats the processing of from step S101 to step S103 at specific intervals of time while the vehicle M continues to travel in the automated drive mode. The abnormality monitoring section 120 thereby monitors the drive source control ECU 82 for the presence or absence of abnormalities.

However, in cases where the predicted behavior of the vehicle M based on an instruction issued to the drive source control ECU 82 and the actual behavior of the vehicle M detected by the vehicle sensors 60 differ from each other by more than the preset range, the comparison section 121 determines there to be an abnormality in the drive source control ECU 82. For example, in cases where the actual acceleration of the vehicle M detected by the vehicle sensors 60 is larger than the requested acceleration by more than the preset range, the comparison section 121 of the present embodiment determines there to be an abnormality in the drive source control ECU 82. In cases where it has been determined that there is an abnormality in the drive source control ECU 82, the abnormality monitoring section 120 performs the sequence of processing described below.

Abnormality Occurrence Notification

First, the abnormality occurrence notification section 122 issues, to the inward-facing output device 94, an instruction to output content prompting a switch from the automated drive mode to the manual driving mode (step S104). For example, the abnormality occurrence notification section 122 issues an instruction to the inward-facing output device 94 to perform voice guidance through the speakers, or display video or image guidance on the display of the navigation device 50. The abnormality occurrence notification section 122 thereby prompts the driver to switch from the automated drive mode to the manual driving mode.

The abnormality occurrence notification section 122 also issues an instruction to the outward-facing output device 95 to output an output alerting nearby vehicles or occupants in nearby vehicles (step S104). For example, the abnormality occurrence notification section 122 issues an instruction to the outward-facing output device 95 to illuminate the hazard lamp 96, sound the audible alarm 97, communicate wirelessly with the communications device 98 (inter-vehicle communication), or the like. The abnormality occurrence notification section 122 thereby alerts nearby vehicles or occupants in nearby vehicles.

In cases where there is determined to be an abnormality in the drive source control ECU 82, the abnormality occurrence notification section 122 cancels the instruction issued to the drive source control ECU 82 by the first notification section 111 of the travel controller 110 (instruction relating to the behavior of the vehicle M based on the action plan generated by the action plan generation section 106) (step S105). For example, the abnormality occurrence notification section 122 of the present embodiment issues an instruction to the first notification section 111 to stop instruction relating to the requested acceleration of the vehicle M issued to the drive source control ECU 82.

Estimation of Future Changes in Positions of Nearby Vehicles

Next, the other vehicle position change estimation section 123 estimates future changes in the position of nearby vehicles (for example, a vehicle in front mA and a vehicle behind mD) (step S106). Specifically, the other vehicle position change estimation section 123 estimates future changes in the position (future position) of nearby vehicles based on the speed, acceleration, and the like of nearby vehicles detected by the detection section DT. For example, the other vehicle position change estimation section 123 is able to perform estimations based on various models such as a constant speed model in which it is assumed that nearby vehicles will travel keeping their current speed, a constant acceleration model in which it is assumed that the nearby vehicles will travel keeping their current acceleration, or another model. The other vehicle position change estimation section 123 may also give consideration to steering angles of nearby vehicles, or may estimate changes in the position of nearby vehicles without giving consideration to the steering angles assuming that nearby vehicles will travel maintaining their current lanes of travel.

Deceleration Plan Derivation

Next, the deceleration plan derivation section 124 derives a deceleration plan to decelerate the vehicle M (step S107). A "deceleration plan" is a plan indicating target behavior (at least one of a target speed, a target deceleration, and the like) of the vehicle M at specific time intervals in order to safely stop the vehicle M or suppress the speed of the vehicle M to less than or equal to a fixed value. For example, the deceleration plan derivation section 124 of the present embodiment derives values of a target deceleration of the vehicle M at plural times in the future as the deceleration plan. Note that alternatively, the deceleration plan derivation section 124 may derive values of a target speed at plural times in the future as the deceleration plan.

The deceleration plan derivation section 124 of the present embodiment, for example, derives a deceleration plan based on objects positioned nearby the vehicle M (for example, nearby vehicles, parked vehicles, pedestrians, guard rails, and utility poles) detected by the detection section DT. Namely, the deceleration plan derivation section 124 derives a deceleration plan that ensures an appropriate distance between objects positioned nearby the vehicle M and the vehicle M. For example, the deceleration plan derivation section 124 derives a deceleration plan for the vehicle M based on future changes in the position of nearby vehicles (for example, a vehicle in front mA and a vehicle behind mD) estimated by the other vehicle position change estimation section 123. Namely, the deceleration plan derivation section 124 derives a deceleration plan that ensures an appropriate inter-vehicle distance between nearby vehicles and the vehicle M at plural times in the future based on future changes in the position of nearby vehicles estimated by the other vehicle position change estimation section 123.

In a specific example, in cases where no vehicle in front mA is present or the inter-vehicle distance (alternatively, the time-to-collision TTC or the headway time THW) between a vehicle in front mA and the vehicle M is greater than a preset threshold value, the deceleration plan derivation section 124 derives a deceleration plan that lowers speed relatively gently. A "deceleration plan that lowers speed relatively gently" means a deceleration plan in which the deceleration is relatively small or the rate of change of the deceleration (deceleration jerk) is relatively small. As an example of a deceleration plan in which the rate of change of deceleration is relatively small, the deceleration plan derivation section 124 of the present embodiment derives a deceleration plan having a rate of change of deceleration that is smaller than a preset limit value. Note that the time-to-collision TTC is a value obtained by dividing the inter-vehicle distance between a target vehicle and the vehicle M in the vehicular direction of progress by the speed of the vehicle M relative to the target vehicle. The headway time THW is a value obtained by dividing the inter-vehicle distance between a target vehicle and the vehicle M in the vehicular direction of progress by the speed of the vehicle M.

However, in cases where the inter-vehicle distance (alternatively, the time-to-collision TTC or the headway time THW) between the vehicle in front mA and the vehicle M is a preset threshold value or less, the deceleration plan derivation section 124 derives a deceleration plan that lowers speed relatively quickly. A "deceleration plan that lowers speed relatively quickly" means a deceleration plan in which the deceleration is relatively large or the rate of change of the deceleration is relatively large. For example, in cases where the inter-vehicle distance between the vehicle in front mA and the vehicle M (alternatively the time-to-collision TTC or the headway time THW) is a preset first threshold value or less, and either a vehicle behind mD is not present or the inter-vehicle distance (alternatively the time-to-collision TTC of the headway time THW) between a vehicle behind mD and the vehicle M is greater than a preset second threshold value (namely, in cases where there is room behind the vehicle M), the deceleration plan derivation section 124 derives a deceleration plan that lowers speed relatively quickly.

The deceleration plan derivation section 124 may derive a deceleration plan based on a preset formula. Alternatively, the deceleration plan derivation section 124 may reference a table of deceleration plan information 138 pre-stored in the storage section 130, and may select a deceleration plan suited to the conditions that the vehicle M is situated in from out of plural deceleration plans included in the deceleration plan information 138. For example, the deceleration plan information 138 may include a standard deceleration pattern, this being a deceleration plan that lowers speed relatively gently, and an emergency deceleration pattern, this being a deceleration plan that lowers speed relatively quickly. Alternatively, the deceleration plan information 138 may include one deceleration plan alone. The deceleration plan may also decelerate the vehicle M using a fixed value for deceleration set in advance.

Moreover, the deceleration plan is not limited to stopping the vehicle M, and may cause the speed of the vehicle M to approach a target speed. For example, the deceleration plan may decelerate the vehicle M to a speed of the vehicle M before an abnormality was detected in the drive source control ECU 82 (a speed of the vehicle M during normal operation), or to a speed for following a vehicle in front mA (to substantially the same speed as a vehicle in front mA).

The deceleration plan derivation section 124 issues the derived deceleration plan to the travel controller 110.

Brake Device Deceleration Instruction

As illustrated in FIG. 2, the travel controller 110 includes a second notification section 112. The second notification section 112 issues an instruction to decelerate the vehicle M based on the deceleration plan generated by the deceleration plan derivation section 124 to the brake device 90 (step S108). For example, as an example of an instruction to decelerate the vehicle M, the travel controller 110 issues, to the brake device 90, an instruction relating to the requested deceleration of the vehicle M to realize the deceleration plan. Note that an "instruction relating to the requested deceleration of the vehicle M" may be an instruction issuing a numerical value of the requested deceleration itself, or may be an instruction issuing a control amount (for example, braking pressure) of the brake device 90 for realizing the requested deceleration.

As explained above, the control switching section 115 detects operations of switching from the automated drive mode to the manual driving mode based on operation of the switch 75 or an operation detection signal input from the operation detection sensors 72. For example, in cases where the brake pedal is operated by an operation amount exceeding a threshold value, the control switching section 115 detects this operation as a switching operation from the automated drive mode to the manual driving mode. In cases where an operation of switching from the automated drive mode to the manual driving mode by the control switching section 115 has been detected, the second notification section 112 of the present embodiment cancels the instruction to the brake device 90 to decelerate the vehicle M. The control mode of the vehicle M thereby transitions to the manual driving mode.

Determining Deceleration Behavior of Vehicle M

Next, the abnormality monitoring section 120 determines whether or not the desired deceleration of the vehicle M is being realized (step S109). In the present embodiment, the comparison section 121 of the abnormality monitoring section 120 compares the predicted behavior of the vehicle M based on an instruction to decelerate the vehicle M issued to the brake device 90 (deceleration behavior) and the actual behavior of the vehicle M detected by the vehicle sensors 60. Then, in cases where a difference between the predicted behavior of the vehicle M based on an instruction to decelerate the vehicle M issued to the brake device 90 and the actual behavior of the vehicle M detected by the vehicle sensors 60 is within a preset range, the comparison section 121 determines that the desired deceleration of the vehicle M is being realized. For example, the comparison section 121 of the present embodiment compares a requested deceleration of the vehicle M based on a deceleration plan derived by the deceleration plan derivation section 124 and an actual deceleration of the vehicle M detected by the vehicle sensors 60, and in cases where a difference between the requested deceleration of the vehicle M and the actual deceleration of the vehicle M detected by the vehicle sensors 60 is within a preset range, determines that the desired deceleration of the vehicle M is being realized. "Actual deceleration" in the present disclosure means the actual deceleration of the vehicle M detected by a sensor or the like.

In cases where the desired deceleration of the vehicle M is being realized, until an operation by the driver to switch from the automated drive mode to the manual driving mode is detected by the control switching section 115, the second notification section 112 of the travel controller 110 continues operations that issue an instruction to the brake device 90 to decelerate the vehicle M.

Additional Deceleration Control Implementation

However, in cases where the desired deceleration of the vehicle M is not being realized, the automated drive ECU 100 implements additional deceleration control (step S110). For example, when the desired deceleration of the vehicle M is not being realized, the second notification section 112 of the travel controller 110 issues, to the supply device 83, an instruction to cut off the supply of the energy source (fuel or electric power) to the drive source 81. Alternatively, in cases where the desired deceleration of the vehicle M is not being realized, the second notification section 112 issues, to the supply device 83, an instruction to cut off the supply of electric power to the drive source control ECU 82. Note that the drive source 81 is set to stop in cases where, for example, the control signal from the drive source control ECU 82 is lost. The automated drive ECU 100 thereby forces the traveling drive force output device 80 to stop.

Note that in cases where the predicted behavior of the vehicle M based on an instruction issued to the drive source control ECU 82 and the actual behavior of the vehicle M detected by the vehicle sensors 60 differ by more than a preset threshold value (in cases of a sudden increase in speed, for example), this additional deceleration control may be implemented without determining whether or not the desired deceleration of the vehicle M is being performed. Also, in cases where a sudden deceleration of the vehicle M is requested, for example, when the distance (alternatively the time-to-collision TTC or the headway time THW) between the vehicle M and an object positioned in front of the vehicle M is a preset threshold value or less, this additional deceleration control may be implemented without determining whether or not the desired deceleration of the vehicle M is being realized.

Note that one or more operation out of steps S105, S106, S107, S108, S109, or S110 that decelerate the vehicle M explained above may be performed at substantially the same time as, or may be performed in advance of, step S104 that internally or externally issues an abnormality in the vehicle M.

Explanation follows regarding a hardware configuration of the automated drive ECU 100. As illustrated in FIG. 3, the automated drive ECU 100 includes plural processors 100a (second processors) capable of executing a program. The processors 100a of the automated drive ECU 100 are provided separately from a processor 82a of the drive source control ECU 82. The number of the processors 100a of the automated drive ECU 100 is greater than the number of the processors 82a of the drive source control ECU 82, for example. For example, the automated drive ECU 100 includes three or more (for example, four) of the processors 100a. Note that "plural processors" in the present disclosure means that plural chip components (packaged components) that are individually connected to signal lines of a circuit board are present. This includes cases, for example, in which the plural chip components are mounted as a unit on a single circuit board.

Each of the plural processors 100a is capable of operating independently from the other processors 100a. For example, each of the plural processors 100a is capable of executing the operations of from step S100 to step S110 described above by reading and executing a pre-stored program. In other words, the plural processors 100a are capable of being operated in parallel such that each of the plurality of processors 100a is configured to have capability to compare the predicted behavior of the vehicle M based on an instruction issued by the first notification section 111 and the actual behavior of the vehicle M detected by the vehicle sensors 60, and in cases where the predicted behavior of the vehicle M based on an instruction issued by the first notification section 111 and the actual behavior of the vehicle M detected by the vehicle sensors 60 differ by more than a preset range, to issue an instruction to decelerate the vehicle M to the brake device 90.

The automated drive ECU 100, the detection section DT, the vehicle sensors 60, and the brake device 90 are designed so as to meet, for example, the level D (ASIL D) standard of the ASIL safety standard described above. For example, by providing the automated drive ECU 100 with high redundancy through the use of plural processors 100a, the automated drive ECU 100 meets the level D (ASIL D) standard.

In the present embodiment, the traveling drive force output device 80 is monitored for abnormalities by the automated drive ECU 100 that meets the level D (ASIL D) standard, and in cases where an abnormality has occurred in the traveling drive force output device 80, deceleration control of the vehicle M is performed by the brake device 90 and the automated drive ECU 100 that meet the same level D (ASIL D) standard. Accordingly, even in cases where the traveling drive force output device 80 by itself does not meet the level D (ASIL D) standard, the vehicle as a whole is able to meet the level D (ASIL D) standard.

The automated drive ECU 100 of the present embodiment described above is capable of further increasing safety. Namely, in cases where an abnormality has occurred in the drive source control ECU 82, such as unintended, sudden acceleration during automated drive, it is necessary to transition from a system-controlled automated drive mode to a driver-controlled manual driving mode. Accordingly, in the vehicle M of the present embodiment, the operational state of the drive source control ECU 82 that controls the drive source 81 is monitored by the automated drive ECU 100, and in cases where an abnormality has occurred in the drive source control ECU 82, an instruction to decelerate the vehicle is issued from the automated drive ECU 100 to the brake device 90. Enough time for transition until transitioning to driver control of the vehicle can thereby be appropriately secured, even when unintended vehicle behavior has occurred in the automated drive mode. Vehicle safety can thereby be further increased.

In the automated drive mode, it is necessary that the vehicle meets a higher safety standard (for example, ASIL D) due to the level of driver control being lower than that of the manual driving mode. As one way to meet such a high safety standard, it is conceivable to design the drive source 81 and the drive source control ECU 82 themselves such that they meet this safety standard. However, as the drive source control ECU 82 is a large-scale system, the development thereof may require, for example, high development costs and a long development time.

In the vehicle M of the present embodiment, even in cases where the drive source 81 or the drive source control ECU 82 does not meet the safety standard, due to realizing both monitoring of the drive source control ECU 82 and deceleration control of the vehicle if an abnormality has occurred in the drive source control ECU 82 by using the automated drive ECU 100 and the brake device 90 that do meet this safety standard, the vehicle as a whole is capable of meeting the safety standard (for example, ASIL D). In other words, the high safety standard required for automated drive can be met with regards to the drive source 81 and the drive source control ECU 82 even when an existing drive source 81 or drive source control ECU 82 is employed. The development cost, the development time, and the like of the vehicle can thereby be improved.

For example, the automated drive ECU 100 of the present embodiment enables the speed of the vehicle M to be reduced by the brake device 90, and enough time for transition until transitioning to driver control of the vehicle to be appropriately secured, even when unintended acceleration of the vehicle M has occurred. Vehicle safety can thereby be further increased.

In the automated drive ECU 100 of the present embodiment, a high level of redundancy of the automated drive ECU 100 is secured through the use of plural processors 100a. Vehicle safety can be further increased by realizing both monitoring of the drive source control ECU 82 and deceleration control of the vehicle if an abnormality has occurred in the drive source control ECU 82 using the automated drive ECU 100 in which such a high level of redundancy has been secured.

In the automated drive ECU 100 of the present embodiment, even when objects (for example, nearby vehicles, parked vehicles, pedestrians, guard rails, and utility poles) are present nearby the vehicle M, deceleration control of the vehicle M is realized with consideration given to such objects. Vehicle safety can thereby be further increased.

In the automated drive ECU 100 of the present embodiment, content prompting transition from the automated drive mode to the manual driving mode is output from the inward-facing output device 94 in cases where an abnormality has occurred in the drive source control ECU 82. The time until transitioning to driver control of the vehicle can thereby be shortened.

In the automated drive ECU 100 of the present embodiment, an instruction to decelerate the vehicle M that has been issued to the brake device 90 is cancelled when a transition has been made from the automated drive mode to the manual driving mode. The level of driver control, after transitioning to driver control of the vehicle, can thereby be increased. Vehicle safety can thereby be further increased.

In the automated drive ECU 100 of the present embodiment, in cases where an abnormality has occurred in the drive source control ECU 82, an instruction to cut off the supply of the energy source to the drive source 81, or an instruction to cut off the supply of electric power to the drive source control ECU 82, is issued from the automated drive ECU 100 to the supply device 83, and the deceleration of the vehicle M is planned. Vehicle safety can thereby be further increased.

Explanation has been given above regarding an embodiment for implementing the present disclosure, with reference to an embodiment; however, the present disclosure is not limited to such an embodiment, and various modifications and substitutions may be applied within a range not departing from the spirit of the present disclosure.

For example, the comparison section 121 of the present embodiment described above may determine an abnormality in the drive source control ECU 82 by comparing the requested acceleration of the vehicle M and the actual acceleration of the vehicle M detected by the vehicle sensors 60. Alternatively, the comparison section 121 may determine an abnormality in the drive source control ECU 82 by comparing the requested speed of the vehicle M and the actual speed of the vehicle M detected by the vehicle sensors 60. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:
1. A vehicle, comprising:
 a drive source that generates traveling drive force of an own vehicle;
 a drive source controller that controls the drive source;
 a brake device that decelerates the vehicle;
 a first detection section that detects actual behavior of the vehicle; and
 an automated drive controller that:
  generates a automated drive action plan for the vehicle,
  issues an instruction relating to behavior of the vehicle based on the generated action plan to the drive source controller, compares predicted behavior of the vehicle predicted based on the issued instruction with the actual behavior of the vehicle detected by the first detection section, and in a case where the predicted behavior of the vehicle and the actual behavior of the vehicle detected by the first detection section differ from each other by more than a preset range, issues an instruction to decelerate the vehicle to the brake device.

2. The vehicle according to claim 1, wherein:
the first detection section detects an actual acceleration of the vehicle; and
the automated drive controller:
issues an instruction relating to a requested acceleration of the vehicle as the instruction relating to behavior of the vehicle,
compares the requested acceleration of the vehicle with the actual acceleration of the vehicle detected by the first detection section, and,
in a case where the actual acceleration of the vehicle detected by the first detection section is larger than the requested acceleration by more than a second preset range, issues the instruction to decelerate the vehicle to the brake device.

3. The vehicle according to claim 1, wherein:
the drive source controller includes at least one first processor that controls the drive source; and
the automated drive controller includes a plurality of second processors in a greater number than the number of the first processor of the drive source controller, the plurality of second processors being capable of operating in parallel with each other such that each of the plurality of second processors is configured to have capability to issue the instruction to decelerate the vehicle to the brake device in the case where the predicted behavior of the vehicle and the actual behavior of the vehicle detected by the first detection section differ from each other by more than the preset range.

4. The vehicle according to claim 1, further comprising:
a second detection section that detects an object positioned nearby the vehicle; wherein,
the automated drive controller, in the case where the predicted behavior of the vehicle and the actual behavior of the vehicle detected by the first detection section differ from each other by more than the preset range, generates a deceleration plan for the vehicle based on the object detected by the second detection section, and issues an instruction to decelerate the vehicle to the brake device based on the generated deceleration plan for the vehicle.

5. The vehicle according to claim 4, wherein:
the second detection section detects, as the object, a nearby vehicle traveling nearby the vehicle; and
the automated drive controller estimates future position of the nearby vehicle detected by the second detection section, and generates the deceleration plan for the vehicle based on the estimated future position of the nearby vehicle.

6. The vehicle according to claim 5, wherein:
the second detection section detects, as the nearby vehicle, a preceding vehicle traveling directly in front of the vehicle and a succeeding vehicle traveling directly behind the vehicle; and
the automated drive controller estimates respective future positions of the preceding vehicle and the succeeding vehicle detected by the second detection section, and generates the deceleration plan for the vehicle based on the estimated future positions of the preceding vehicle and the succeeding vehicle.

7. The vehicle according to claim 1, further comprising:
a supply device that supplies the drive source with an energy source of at least one of fuel or electric power, and that supplies electric power to the drive source controller; wherein
the automated drive controller, in the cases where the predicted behavior of the vehicle and the actual behavior of the vehicle detected by the first detection section differ from each other by more than the preset range, issues, to the supply device, at least one out of an instruction to cut off the supply of the energy source to the drive source and an instruction to cut off the supply of the electric power to the drive source controller.

8. The vehicle according to claim 7, wherein:
the automated drive controller:
after issuing the instruction to decelerate the vehicle to the brake device, compares the predicted behavior of the vehicle predicted based on the issued instruction to decelerate the vehicle and the actual behavior of the vehicle detected by the first detection section, and
in a case where the predicted behavior of the vehicle based on the issued instruction to decelerate the vehicle and the actual behavior of the vehicle detected by the first detection section differ from each other by more than a second preset range, issues, to the supply device, at least one out of the instruction to cut off the supply of the energy source to the drive source and the instruction to cut off the supply of electric power to the drive source controller.

9. The vehicle according to claim 1, further comprising:
an output device that outputs an output recognizable by a driver of the vehicle; wherein
in the case where the predicted behavior of the vehicle and the actual behavior of the vehicle detected by the first detection section differ from each other by more than the preset range, the automated drive controller issues, to the output device, an instruction to output content prompting switching from a automated drive mode to a manual driving mode.

10. The vehicle according to claim 9, wherein:
the automated drive controller includes a switching section that detects an operation of switching from the automated drive mode to the manual driving mode, and, in a case where a switching operation from the automated drive mode to the manual driving mode has been detected by the switching section, the automated drive controller cancels the instruction to the brake device to decelerate the vehicle.

11. A vehicle, comprising:
a drive source that generates traveling drive force of the vehicle;
a drive source controller that controls the drive source;
a supply device that supplies the drive source with an energy source of at least one of fuel or electric power, and that supplies electric power to the drive source controller;
a detection section that detects actual behavior of the vehicle; and
a automated drive controller that:
generates a automated drive action plan for the vehicle,
issues the drive source controller an instruction relating to behavior of the vehicle based on the generated action plan, compares predicted behavior of the vehicle predicted based on the issued instruction and the actual behavior of the vehicle detected by the detection section, and in a case where the predicted behavior of the vehicle and the actual behavior of the vehicle detected by the detection section differ from each other by more than a preset range, issues, to the supply device, at least one out of an instruction to cut off the supply of the energy source to the drive source and an instruction to cut off the supply of electric power to the drive source controller.

12. A vehicle controller, comprising:
a generation section that generates a automated drive action plan for an own vehicle;
a first notification section that issues an instruction relating to behavior of the vehicle based on the action plan generated by the generation section to a drive source controller that controls a drive source of the vehicle;
a comparison section that compares predicted behavior of the vehicle predicted based on the instruction issued by the first notification section with an actual behavior of the vehicle detected by a detection section; and
a second notification section that issues an instruction to decelerate the vehicle to a brake device of the vehicle in a case where the predicted behavior of the vehicle and the actual behavior of the vehicle compared by the comparison section differ from each other by more than a preset range.

13. A vehicle controller, comprising:
a generation section that generates a automated drive action plan for a vehicle;
a first notification section that issues an instruction relating to behavior of the vehicle based on the action plan generated by the generation section to a drive source controller that controls a drive source of the vehicle;
a comparison section that compares predicted behavior of the vehicle predicted based on the instruction issued by the first notification section with an actual behavior of the vehicle detected by a detection section; and
a second notification section that, in a case where the predicted behavior of the vehicle and the actual behavior of the vehicle compared by the comparison section differ from each other by more than a preset range, issues, to a supply device which supplies an energy source of at least one of fuel or electric power to the drive source and which supplies electric power to the drive source controller, at least one out of an instruction to cut off the supply of the energy source to the drive source and an instruction to cut off the supply of electric power to the drive source controller.

14. A vehicle control method comprising steps of:
generating, by using an onboard computer, a automated drive action plan for an own vehicle;
issuing, by using the computer, an instruction relating to behavior of the vehicle based on the generated action plan to a drive source controller that controls a drive source of the vehicle;
comparing, by using the computer, predicted behavior of the vehicle predicted based on the issued instruction with detected actual behavior of the vehicle; and issuing, by using the computer, an instruction to decelerate the vehicle to a brake device of the vehicle in a case where the compared predicted behavior of the vehicle and the actual behavior of the vehicle differ from each other by more than a preset range.

15. A vehicle control method comprising steps of:
generating, by using an onboard computer, a automated drive action plan for the vehicle;
issuing, by using the computer, an instruction relating to behavior of the vehicle based on the generated action plan to a drive source controller that controls a drive source of the vehicle;
comparing, by using the computer, predicted behavior of the vehicle predicted based on the issued instruction and detected actual behavior of the vehicle; and,
in a case where the compared predicted behavior of the vehicle and actual behavior of the vehicle differ from each other by more than a preset range, issuing by using the computer, to a supply device, which supplies an energy source of at least one of fuel or electric power to the drive source and which supplies electric power to the drive source controller, at least one out of an instruction to cut off the supply of the energy source to the drive source and an instruction to cut off the supply of electric power to the drive source controller.

16. A non-transitory computer readable medium storing a vehicle control program that causes an onboard computer to:
generate a automated drive action plan for an own vehicle;
issue an instruction relating to behavior of the vehicle based on the generated action plan to a drive source controller that controls a drive source of the vehicle;
compare predicted behavior of the vehicle predicted based on the issued instruction with detected actual behavior of the vehicle; and
issue an instruction to decelerate the vehicle to a brake device of the vehicle in a case where the compared predicted behavior of the vehicle and actual behavior of the vehicle differ from each other by more than a preset range.

17. A non-transitory computer readable medium storing a vehicle control program that causes an onboard computer to:
generate a automated drive action plan for the vehicle;
issue an instruction relating to behavior of the vehicle based on the generated action plan to a drive source controller that controls a drive source of the vehicle;
compare predicted behavior of the vehicle predicted based on the issued instruction and detected actual behavior of the vehicle; and,
in a case where the compared predicted behavior of the vehicle and actual behavior of the vehicle differ from each other by more than a preset range, issue, to a supply device, which supplies an energy source of at least one of fuel or electric power to the drive source and which supplies electric power to the drive source controller, at least one out of an instruction to cut off the supply of the energy source to the drive source and an instruction to cut off the supply of electric power to the drive source controller.

* * * * *